(12) United States Patent
Nelson et al.

(10) Patent No.: US 12,729,783 B2
(45) Date of Patent: Sep. 8, 2026

(54) ADJUSTABLE PIPE SUPPORT

(71) Applicant: NORTH ARROW ENTERPRISES, LLC, Anchorage, AK (US)

(72) Inventors: Bradley Nelson, Anchorage, AK (US); Brian Daniel Green, Anchorage, AK (US)

(73) Assignee: North Arrow Enterprises, LLC, Anchorage, AK (US)

( * ) Notice: Subject to any disclaimer, the term of this patent is extended or adjusted under 35 U.S.C. 154(b) by 0 days.

(21) Appl. No.: 18/770,323

(22) Filed: Jul. 11, 2024

(65) Prior Publication Data

US 2025/0020242 A1 Jan. 16, 2025

Related U.S. Application Data

(60) Provisional application No. 63/513,136, filed on Jul. 12, 2023.

(51) Int. Cl.
*F16L 3/20* (2006.01)

(52) U.S. Cl.
CPC .................................... *F16L 3/20* (2013.01)

(58) Field of Classification Search
CPC .................................... F16L 3/20; F16L 3/02
See application file for complete search history.

(56) References Cited

U.S. PATENT DOCUMENTS

| | | | | |
|---|---|---|---|---|
| 800,806 A * | 10/1905 | King | B66F 11/04 | 211/209 |
| 831,994 A * | 9/1906 | Rudman | B66F 3/02 | 425/DIG. 126 |
| 5,934,626 A * | 8/1999 | Collins, Jr. | B23K 37/0538 | 269/289 MR |
| 6,502,791 B2 * | 1/2003 | Parker | F16L 3/18 | 248/405 |
| 6,591,956 B1 * | 7/2003 | Neugent | F16D 41/30 | 192/64 |
| 10,322,475 B2 * | 6/2019 | Collins, Jr. | B25H 1/10 | |
| 10,648,594 B1 * | 5/2020 | Faulkner | F16M 11/24 | |
| 12,435,817 B2 * | 10/2025 | Fujisawa | F16L 3/16 | |
| 2010/0301186 A1 * | 12/2010 | Chuang | A47B 9/00 | 248/157 |
| 2014/0021420 A1 * | 1/2014 | Beelen | F16L 3/20 | 254/30 |
| 2017/0204993 A1 * | 7/2017 | Eljaouhari | F16L 3/237 | |
| 2022/0014001 A1 * | 1/2022 | Rokuskie | H02G 7/00 | |

FOREIGN PATENT DOCUMENTS

| | | | |
|---|---|---|---|
| CN | 115143322 A * | 10/2022 | F16L 3/20 |

* cited by examiner

*Primary Examiner* — Terrell L Mckinnon
*Assistant Examiner* — Ding Y Tan
(74) *Attorney, Agent, or Firm* — BakerHostetler

(57) ABSTRACT

Adjustable pipe supports can include a drive mechanism for substantially symmetrically raising and lowering a horizontal beam to emplace and over time adjust such beams bearing a load. Base and support sections of operatively coupled lifting towers are configured to move with respect to one another using the common drive mechanism, with the horizontal beam coupled to the support section.

20 Claims, 10 Drawing Sheets

102
148
112
114
133
110
132
144
142
154
132
130
150
133
156
118
100

144
150
152
118
102
102
154
152
130
118
100

102
148
112
114
110
150
118
133
102

148
112
114
102
133

150
102
133

102
150
110
102
154'
118
133

102
150
102
154'
118
133

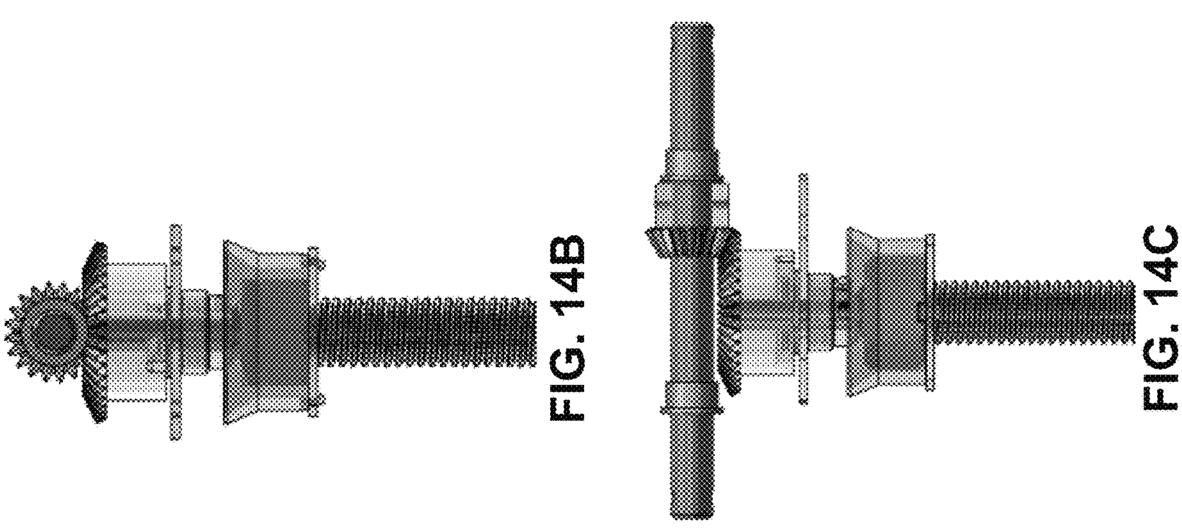
FIG. 14B
FIG. 14C
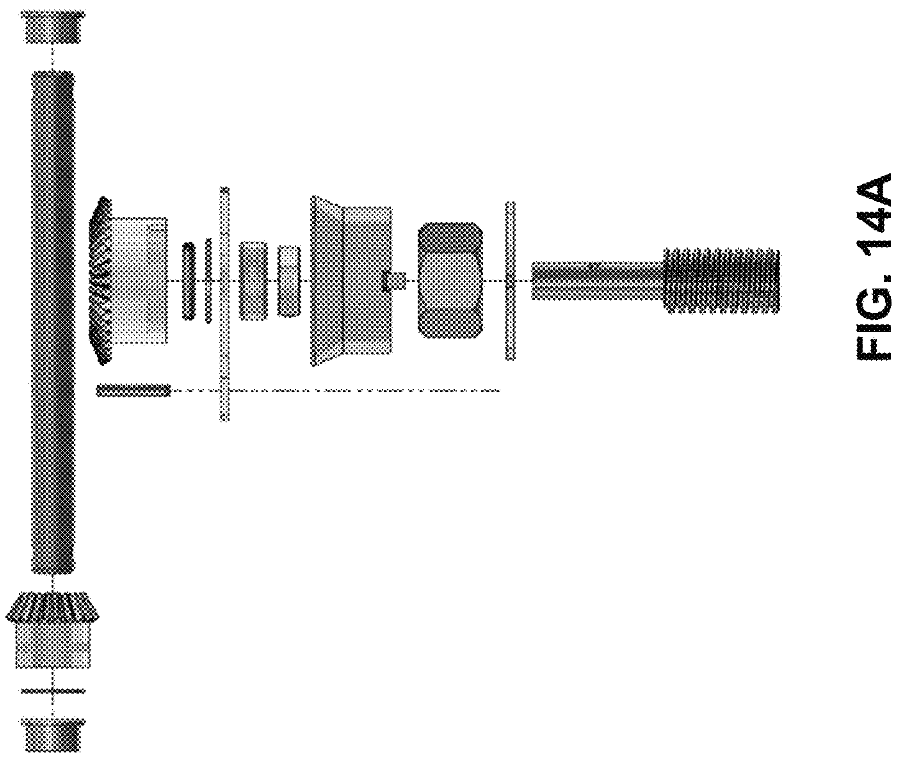
FIG. 14A

ADJUSTABLE PIPE SUPPORT

CROSS-REFERENCE TO RELATED APPLICATION

This application claims priority to and the benefit of U.S. Provisional Patent Application No. 63/513,136, filed Jul. 12, 2023 and titled "Adjustable Pipe Support," the entirety of which is incorporated herein by reference.

FIELD OF INVENTION

This disclosure relates to pipeline supports, and more particularly an adjustable pipeline or utility line support apparatus that is adjustable and maneuverable.

BACKGROUND

Subsidence and similar phenomena create risks and impose losses on many types of construction and infrastructure projects. Such occurrences impose significant risks to human and animal life, the environment, and businesses in the context of pipelines, particularly above-ground pipelines that carry fluid (e.g., oil or gas pipelines). These pipelines are carefully engineered to follow specific paths and maintain alignment while subject to tremendous stresses as a function of the structure being supported and fluid being carried. Subsidence around supports for above ground pipelines results in displacement of various structural members (assuming they were properly installed to begin with) and uneven stresses or a lack of support altogether during use and can place the structural integrity of the pipeline in peril. These risks can be particularly high in climes that experience extreme weather and regular freeze-thaw cycles. Similar situations can occur in wet or sloped areas subject to erosion, regions with soft earth, et cetera, and as a result of a pipeline or other load causing changing stress as a result of shifting, settling, damage, deterioration, dynamic loads, et cetera.

Despite these risks, many pipeline supports are constructed by pounding piles into the ground and placing a beam atop the piles at an arbitrary, fixed height beneath the pipeline. These are very vulnerable to subsidence, and changing the height of the support beam to remediate shifting or damage is costly and labor intensive, and complex to do safely. Adjustment or reinstallation of traditional pipelines requires multiple laborers, significant equipment, backup support, and other time consuming and costly preparations and precautions. When subsidence occurs, the structures may be difficult or impossible to adjust. They are also difficult to replace because they cannot be maneuvered when assembled and are difficult to assemble on-site. In particular, piles driven into the ground are hard to adjust or move, particularly in harsh environments where the ground may be frozen or wet environments where heavy equipment is not easily maneuvered. They often require large heavy equipment and multiple laborers to properly install, increasing the time for pipeline construction and maintenance and adjustments are so complex they usually require full pipeline shutdowns.

Accordingly, it would be beneficial to provide a support apparatus (for, e.g., pipelines) and method of using the same facilitating efficient installation with minimal labor both for initial use and for adjustments based on subsidence or other changes to the environment or load.

SUMMARY

In an alternative embodiment, a lifting apparatus comprises a base and two lifting towers. The lifting towers each comprise a base section and a support section, with the base section disposed at least partially within the support section. Both support sections are configured to be substantially equivalently and simultaneously raised or lowered with respect to their respective base section using a drive. A beam disposed between the lifting towers and coupled to the support sections is raised or lowered in this manner.

Other portions of this disclosure will describe various alternative and complementary embodiments. As such, the foregoing summary is provided for purposes of example only, and should not be deemed in any way to limit the scope or spirit of the disclosure or claims.

BRIEF DESCRIPTION OF DRAWINGS

FIG. 14A illustrates a portion of a drive mechanism disclosed herein.

FIG. 14B illustrates a portion of a drive mechanism disclosed herein.

FIG. 14C illustrates a portion of a drive mechanism disclosed herein.

DETAILED DESCRIPTION

Figures 1, 2:
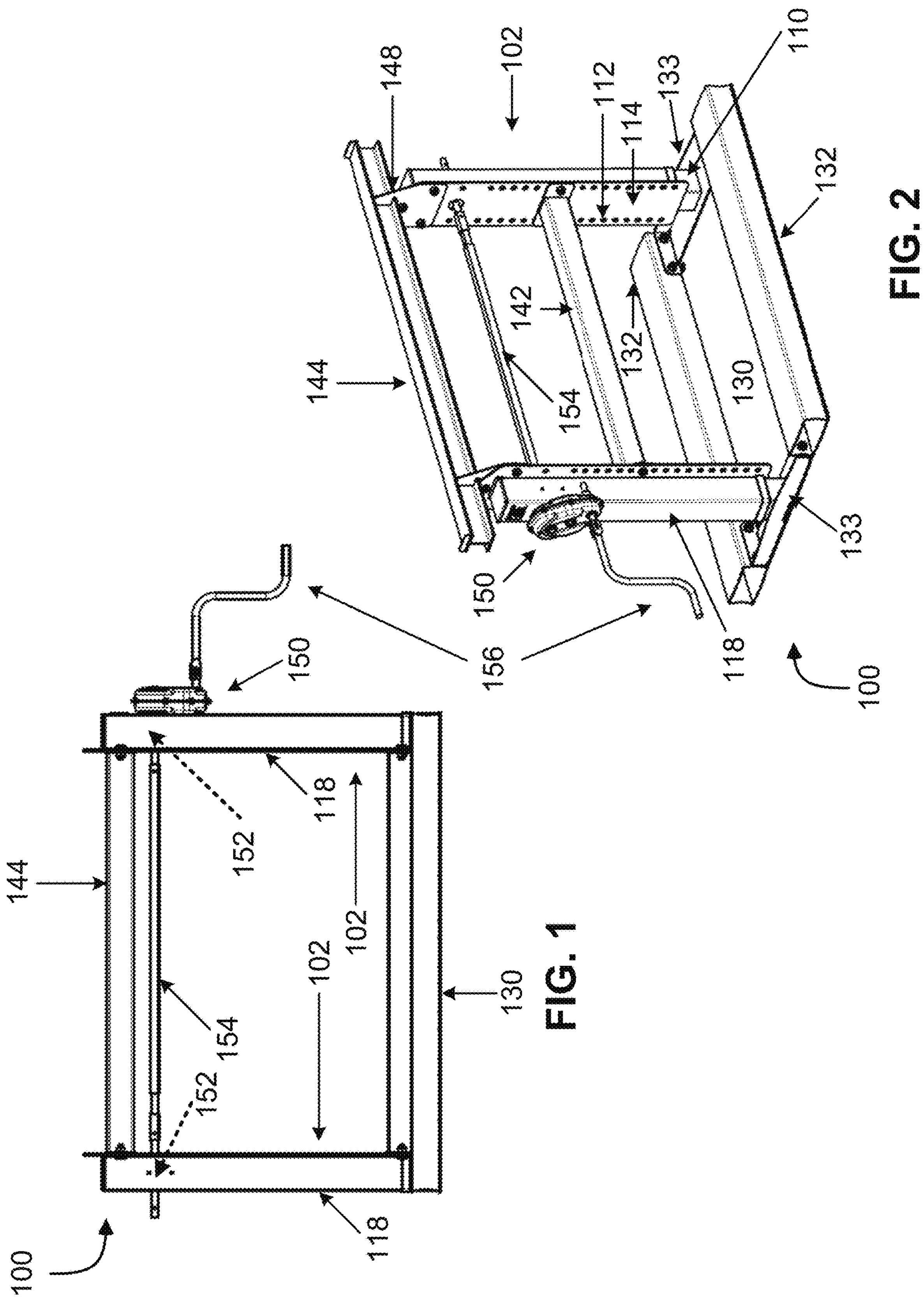
FIG. 1 illustrates a front view of a single stage support apparatus disclosed herein.
FIG. 2 illustrates a view of an isometric view of a single stage support apparatus disclosed herein.

The disclosure herein addresses issues with supports, such as pipeline supports, by providing a maneuverable and flexible support member that is resistant to subsidence and adjustable for height to allow for precise installation and in-place adjustment over time. The construction of the apparatuses disclosed herein provides exceptional stability, with components welded or bolted tightly together to perform as a single unit, regardless of the height to which beams are adjusted. While the drawings include illustrations with multiple beams, the structure retains rigidity, strength, and stability with a single beam. Alternatives may require a racking beam in addition to the load support beam, but this is not required in the disclosed embodiments, which adds flexibility, eliminates additional unique parts, and reduces unit cost.

In short, embodiments disclosed herein include two lifting towers removably attached to a base. The lifting towers include, in various embodiments two (for single stage towers) or three (for two stage towers) nested tubular members. In two-stage towers, the interior members (one per tower) with the smallest dimensions are an extension removably attached to the base that allow the other two tubular members (per tower) to be moved up or down with respect to the base (and one another). The tubular members immediately smaller than the outer member (the smaller dimensions on a one stage tower, and the middle dimensions in a two stage tower, in both cases one per tower) provide to each tower a fixed point from which the outer tubular members can be raised or lowered using screws or other appropriate means. (In two stage towers, the middle dimensioned tubular member is removably fixed with respect to the interior tubular member.) In embodiments, the screws (or other appropriate means) can be coupled using a driveshaft (or other appropriate means) spanning the two towers such that operation of a crank, jack, et cetera, on only one side raises and lowers the outer member on both towers. Cross-beam support members for supporting a load can be coupled with the outer tubular members and move up and down therewith, allowing the cross-beam support members to be movably arranged about or in contact with a load and easily adjusted over time by operating the screws or other appropriate means. In embodiments, the screws (and/or driveshaft, or other appropriate means) can be operated using a gearbox and crank (or other appropriate means). In embodiments, mounting plates (one per tower) extending beyond at least one dimension of the outer members can be attached to an inboard side of each outer tubular member to provide additional mounting range for load-bearing cross-beams, providing additional mounting points to add strength and in embodiments reducing weight (in comparison with enlarging the size of the outer members. In alternative embodiments, mounting plates matching a face of the outer member, or smaller than a face of the outer member, may be used.

In two stage systems, when adjustments beyond the range of travel of the screw (or other appropriate means) is required, the interior tubular members can be decoupled from the middle interior members (e.g., by removing bolts or other hardware fixing the inner and middle tubular members with respect to one another) and the inner and middle members can be adjusted with respect to one another by sliding the middle members up or down the inner members before fixedly reattaching the two using the hardware. To prevent dropping or bottoming out of the moving portion, "kickstands" attached to the base can be rotated from a stowed position flat in the base to a vertical position adjacent the inner tubular members to provide a stop to downward motion of the moving section during large adjustments. In embodiments, the screw can be used to place the moving section (e.g., lowest cross-beam support or mounting flange) against or nearly against the kickstand before removing hardware to prevent any unintended movement. The foregoing is intended to orient to novel and nonobvious aspects of the disclosure in describing the primary elements and function of the system provided in more detail below, but should in no way be construed as limiting interpretation of the invention disclosed including alternative and embodiments complementary to those described above.

Figure 4:
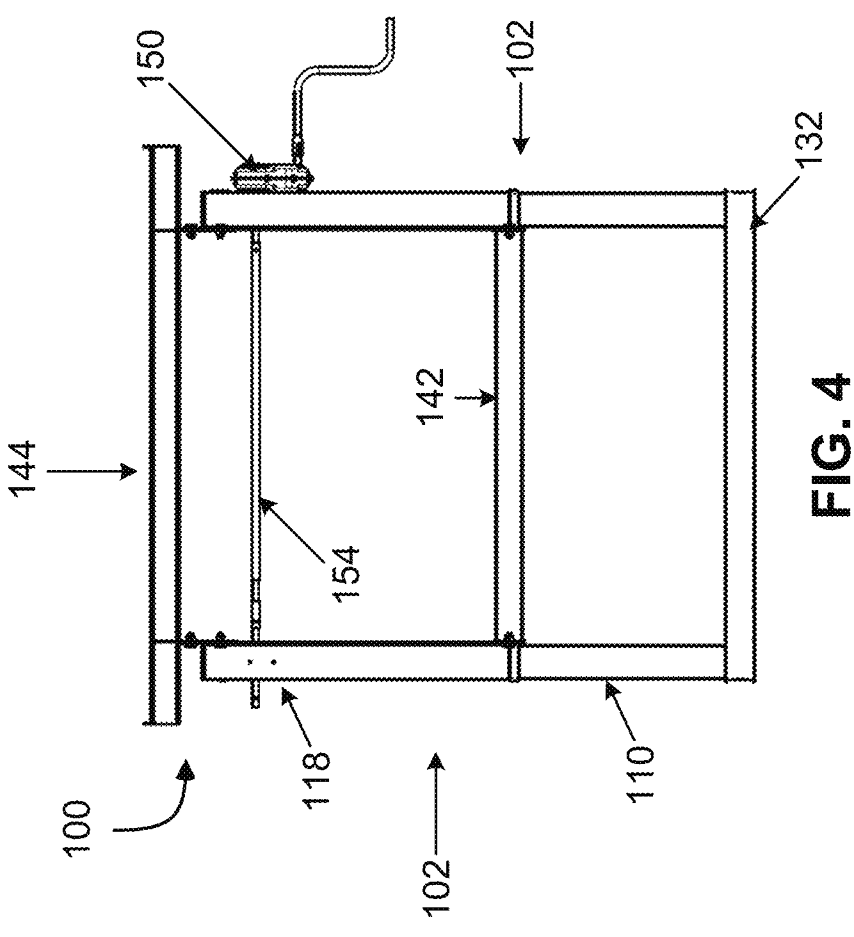
FIG. 4 illustrates a front view of a single stage support apparatus disclosed herein.
Figure 3:
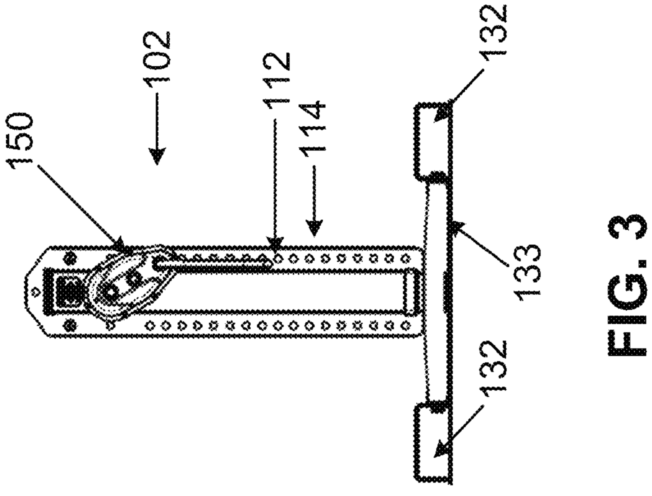
FIG. 3 illustrates a side view of a single stage support apparatus disclosed herein.
Figures 5, 6, 7:
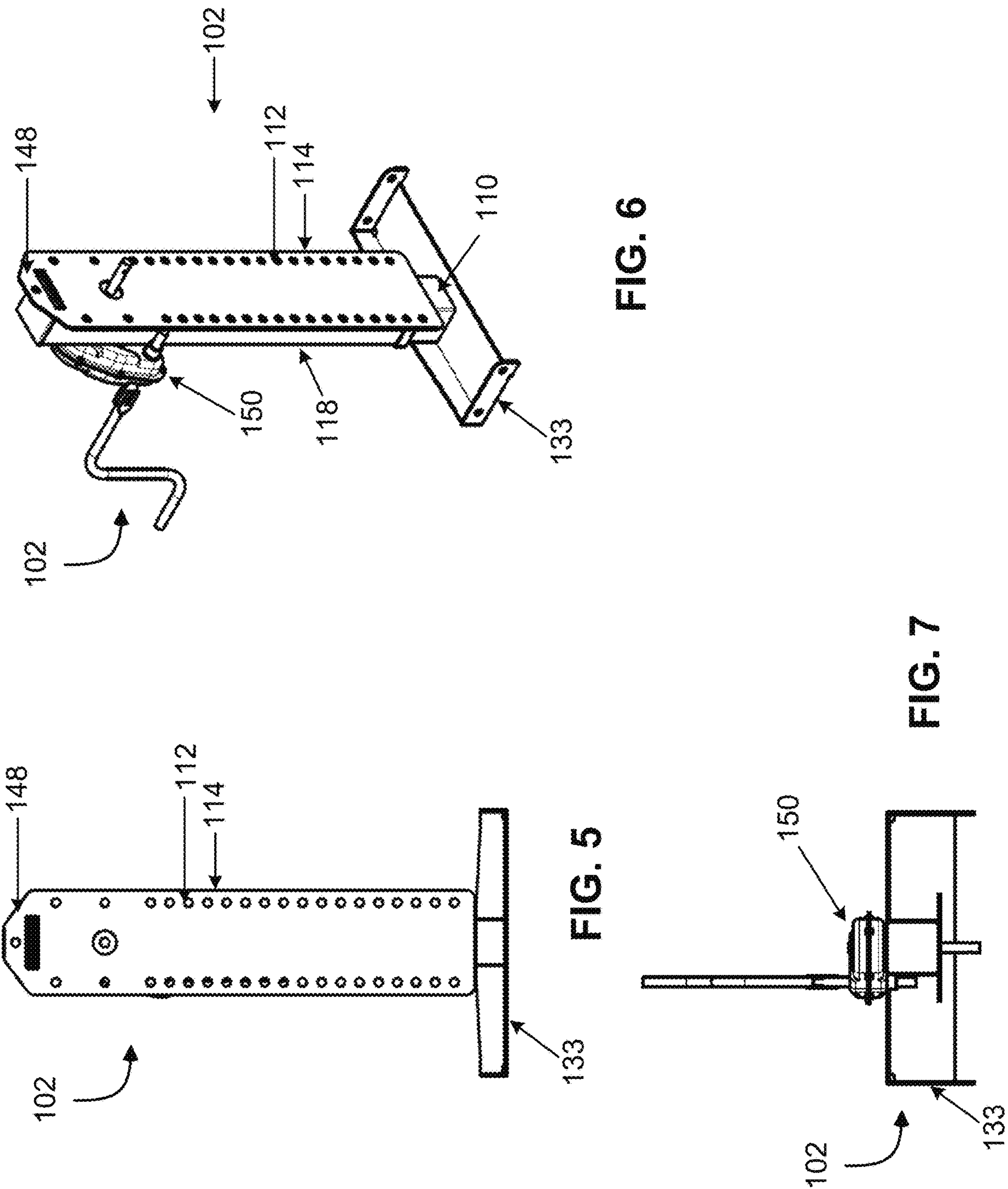
FIG. 5 illustrates a front view of a lifting tower for a single stage support apparatus disclosed herein.
FIG. 6 illustrates an isometric view of a lifting tower for a single stage support apparatus disclosed herein.
FIG. 7 illustrates a top view of a lifting tower for a single stage support apparatus disclosed herein.
Figures 8, 9:
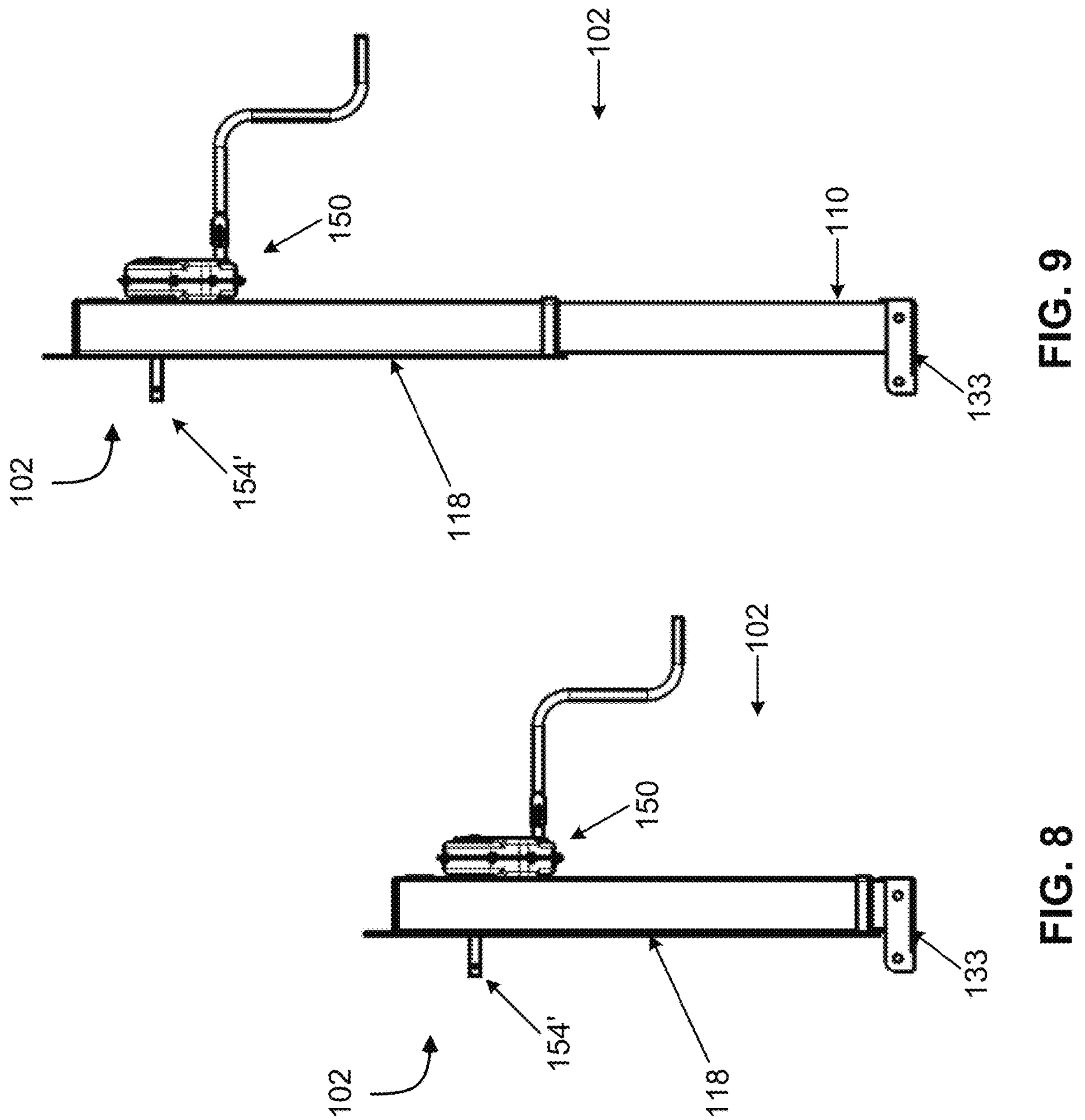
FIG. 8 illustrates a side view of a lifting tower for a single stage support apparatus disclosed herein in a retracted state.
FIG. 9 illustrates a side view of a lifting tower for a single stage support apparatus disclosed herein in an extended state.

FIGS. 1-9 illustrate a single stage adjustable support apparatus 100 disclosed herein. In particular, FIGS. 1-4 show assembled apparatus 100, while FIGS. 5-9 provide different views of lifting towers 102 decoupled from other elements. FIGS. 1, 2, and 3 show apparatus 100 in a retracted state; and FIG. 4 shows apparatus 100 in an extended state. FIGS. 5-8 show a lifting tower 102 (the lifting tower 102 with gearbox 150 attached to drive axle 154/axle attachment 154') in a retracted state, while FIG. 9 illustrates a lifting tower in an extended state.

Apparatus 100 includes lifting towers 102 disposed at or toward a lengthwise end of apparatus 100 and substantially centered widthwise on base 130. The height of apparatus 100 is adjustable based on adjustments to lifting towers 102. As further described below, lifting towers 102 of the single stage apparatus 100 include a base section 110 and a support section 118 that are configured to move with respect to one another using crank 156 and elements operatively coupled therewith. In embodiments, one or more of base section 110 and support section 118 can be hollow structural section (HSS), C- or U-channel, or other appropriate structure.

Each lifting tower 102 includes a number of components, including lifting tower flange 114. Lifting tower flange 114 can be welded to support section 118 or attached in other manners (e.g., bolts, rivets, mating components of flange 114 and support section 118, combinations of techniques). Lifting tower flange 114 includes a plurality of horizontal beam mounting holes 112 therethrough, which may be spaced wider than a width of lifting tower 102 to permit adjustment of lifting tower 102 while hardware is passed through horizontal beam mounting holes 112 (e.g., such that support section 118 does not interfere with hardware being passed through mounting holes 112). Horizontal beam mounting holes 112 are configured for mounting one or more cross-beams to support a load, such as, e.g., horizontal beams 142 and/or 144 between the lifting towers 102. Horizontal beam mounting holes 112 can be configured to accept various types of hardware, including threaded bolts, pins, or other elements for fixing horizontal beams 142 and/or 144 at desired heights or positions. Lifting tower flange 114 is mounted to support section 118.

In embodiments, horizontal beam mounting holes 112 can be arranged at various intervals. For example, the holes may be 2" apart, or any other distance, and the beams can be mounted at any height within those intervals up and down lifting tower 102.

As lifting tower flange 114 moves up or down along base section 110 with support section 118, this changes the height of horizontal beams 142 and/or 144. Lifting tower flange is given its range of motion by way of motion between support section 118 and base section 110 using the jack (or other raising and lowering functionality) integrated therein. In alternative embodiments, horizontal beam mounting holes 112 can be positioned such that the hardware passes through the components across the width of apparatus 100 as opposed to being aligned with the length thereof. In embodiments incorporating a variety of horizontal beam mounting holes 112, lifting tower flange 114 can be configured to accept many different quantities or geometries of horizontal beams, adding greater flexibility and utility to apparatus 100.

Horizontal mounting beams 142 and 144 include horizontal beam flange 146 and beam flange lifting eyes 148. Beam flange lifting eyes 148 (and other eyelets on apparatus 100) can permit apparatus 100 or parts thereof to be lifted by crane or secured in other manners. Beam flange lifting eye 148 provides an attachment point for lifting horizontal beams 142 and/or 144, and may be used as an attachment or handling point for apparatus 100 when horizontal beam 144 (or any beam located at a top of lifting towers 102) is arranged to permit access to beam flange lifting eye 148. In embodiments beam flange lifting eye(s) 148 can be arranged at an angle, be offset, or protrude in a different direction to allow for easier attachment to move apparatus 100 when a horizontal beam is installed to the apparatus.

Horizontal beam flange 146 contains holes configured to align with horizontal beam mounting holes 112 such that horizontal beams 142 and/or 144 can be mounted to lifting towers 102 at one or more vertical positions thereon. Horizontal beam flange 146 can include holes to allow horizontal beams 142 and/or 144 to be mounted at substantially right angles to lifting towers 102 or at other angles.

Horizontal beams 142 and 144 (and any other horizontal beams) need not be the same size, shape, material, et cetera. The use of a flat lifting tower flange 114 (as opposed to a channel in which each beam is arranged) and a corresponding horizontal beam flange permits the use of many different shapes of horizontal beams (e.g., box tube, C-channel, W-beam, et cetera). For example, as depicted in FIGS. 1, 2, and 4, horizontal beam 144 is a wide W-beam extending beyond the outer edges of the lifting towers 102; and horizontal beam 142 shown in FIGS. 2 and 4 is a box beam. Other options or combinations are illustrated or otherwise disclosed herein.

In, e.g., FIGS. 2 and 4, two horizontal beams 142 and 144 are shown. However, in alternative embodiments, apparatus 100 can be used with only one horizontal beam 142 or 144. In further embodiments, additional horizontal beams (e.g., three or more) could be used without departing from the scope or spirit of the innovation. Different numbers of beams can be used to accommodate, e.g., greater flexibility with limited disassembly/reassembly, stability or strength of apparatus 100, the inclusion or storage of extra beams, support for multiple loads at different heights, or other benefits.

Lifting towers 102 can be coupled to base 130 in a variety of ways. In the illustrated embodiment, foot 133 can be coupled to each lifting towers 102. In an embodiment, bolts 124 can be used to couple foot 133 to channels 132. In embodiments, bolts 124 can be unwelded bolts. By permitting partial or complete disassembly of apparatus 100, additional flexibility and mobility can be achieved. In alternative or complementary embodiments, other means of attaching lifting towers 102 to base 130 can be employed. For example, the use of removable bolts or other hardware to attach and detach one or both of lifting towers 102 can permit apparatus 100 to be positioned or withdrawn from under low structures (e.g., pipelines) while upright (e.g., being maneuvered upright using a forklift, being pushed under the structure from a side of the structure, being removed from under the structure). Moreover, unwelded bolts can be easily replaced, whereas welded bolts are expensive and difficult to replace. In embodiments, foot 133 can be formed as a single piece with extension 120, or can be welded or otherwise permanently attached to extension 120. In particular, the side-bolted connection coupling foot 133 and channels 132 provides reduced fabrication costs, simple field assembly, and simple fouled bolt replacement options. However, other means of attaching lifting tower 102 to base 130 (with or without foot 133) will be appreciated in view of the disclosures herein.

Base 130 provides a flat platform that can be positioned to place apparatus 100 in the desired position. Base 130 can comprise a plate or surface providing a wide surface area to resist uneven sinking of base 130 based on environmental conditions or loading of apparatus 100. While base 130 is shown as a contiguous plate covering the entirety of base 130, in alternative embodiments, base 130 can extend across less than the complete footprint of apparatus 100 or include cutouts or apertures. Such alternatives could provide benefits relating to drainage, weight, cost, et cetera.

Base 130 includes structural channels 132. Structural channels 132 can be configured to strengthen and stiffen base 130. Structural channels 132 are also configured to accept, e.g., the forks of a forklift to permit motorized handling of base 130 or fully assembled apparatus 100.

Positioned on base 130, lifting towers 102 can be extended or retracted to change the height of horizontal beams 142 and/or 144 to provide support to a pipeline or other load. Gearbox 150 can provide a geared mechanism for raising and lowering support section 118 with respect to base section 110. Gearbox 150 can include a gear operatively coupled with crank 156. In embodiments, the gear is a two speed gear, having high and low settings to move support section 118 (and elements coupled thereto) faster or slower with each turn. The gear is also operatively coupled to lifting tower drive shaft 152 (within lifting tower 102) and axle 154, allows rotation of the gear in gearbox 150 to influence both lifting towers. In an embodiment, axle 154 can be a two piece axle. A two piece axle can allow both lifting towers to be raised at the same rate with one turn of crank 156. A two piece axle can be provided in two halves that nest into each other to allow them to be connected blindly inside of the horizontal beam without bolts in situations when the beam needs to be placed in such a way as to encapsulate the axle. In embodiments, axle 154 can be a slip fit axle.

Rotation of the gear in gearbox 150, and rotation of axle 154, can drive a mechanism for raising and lowering each support section 118 in relation to each base section 110, respectively. In an embodiment, a nut or stop can sit atop base section 110, or be larger than an opening of base section 110, within support section 118. A screw or other extender can be driven based on the turning of crank 156, and through interaction with the nut or stop, drive support section 118 up or down with respect to the nut or stop (and therefore up or down in relation to base section 110). When the crank is turned the other way, the screw or other mechanism can be driven such that a larger portion of the length is nested in base section 110, thereby allowing support section 118 to move lower along base section 110.

While a particular arrangement showing gearbox 150, axle 154, and crank 156 is depicted in FIGS. 1-9, it should be understood that other means of driving, separately or together, two lifting towers 102 are possible, and will be appreciated by those of skill in the art on review of the disclosures herein.

In embodiments, a length of base 130 can be approximately seven feet nine inches, and the length of beams 142 and/or 144 can be approximately seven feet. In embodiments, apparatus 100 can have a height (from the bottom of base 130 to the top of beam 144) of three feet nine inches in the lowest position, five feet two inches in the highest position not utilizing extension 120, and a height of six feet four inches in a highest second stage lift with extension 120.

In embodiments, the base can have a width of three feet five inches. Eyelets for lifting may extend heights or widths by two inches or more in a direction in which the eyelet protrudes, but larger or smaller eyelets can be used. In alternative embodiments, apparatus 100 can be made to any scale, and utilize different ratios of height, length, and/or width, without departing from the scope or spirit of the innovation.

In embodiments, parts of apparatus 100 can be made of galvanized steel or other materials. In embodiments, parts of apparatus 100 can be made of cold-formed welded and seamless carbon steel structural tubing such as ASTM A500. In embodiments, parts of apparatus 100 can be made of ASTM A572 Grade 50 or A36 steel, or plain carbon steel.

Figure 10:
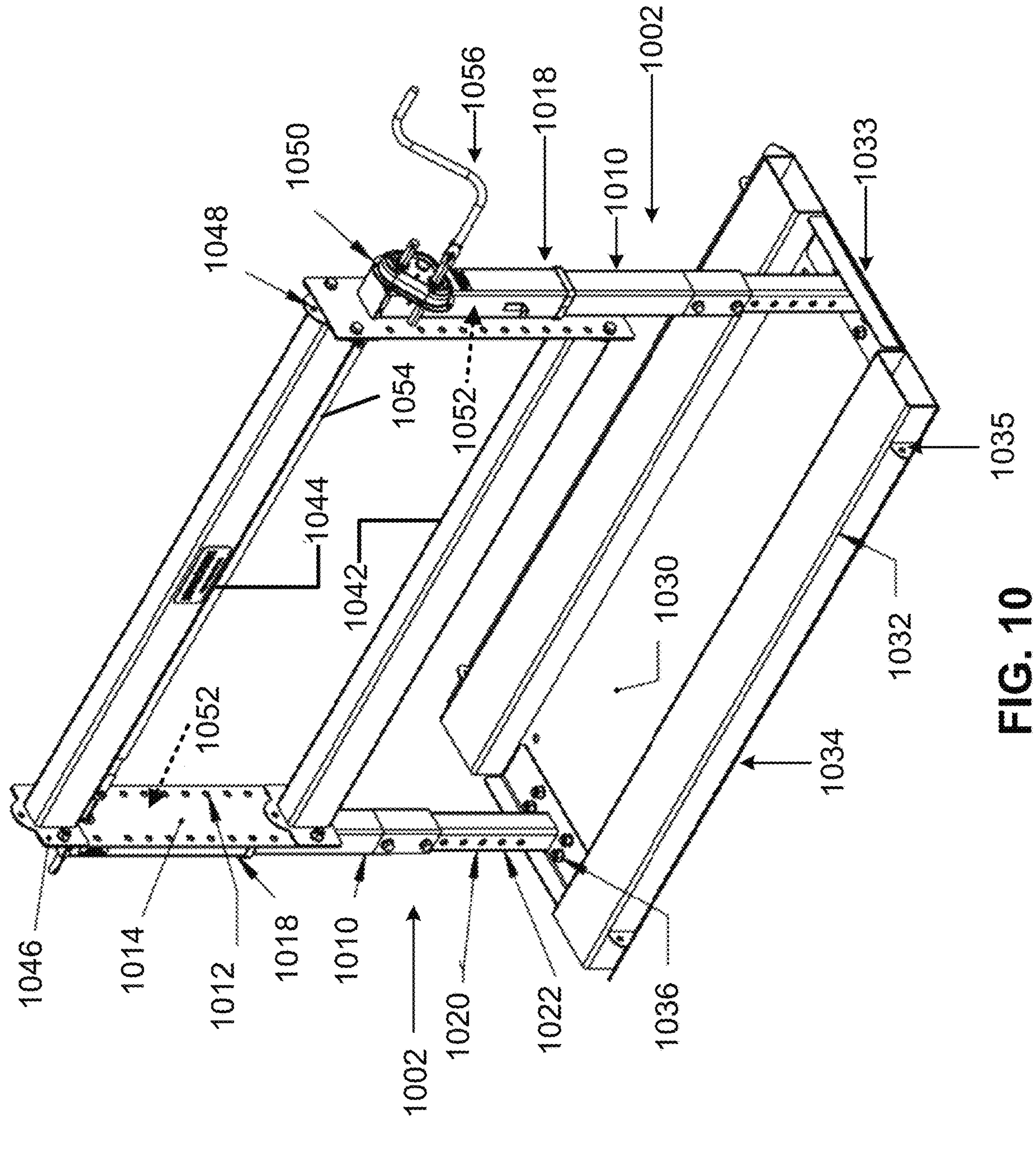
FIG. 10 illustrates an isometric view of a two stage lifting apparatus disclosed herein.
Figure 11:
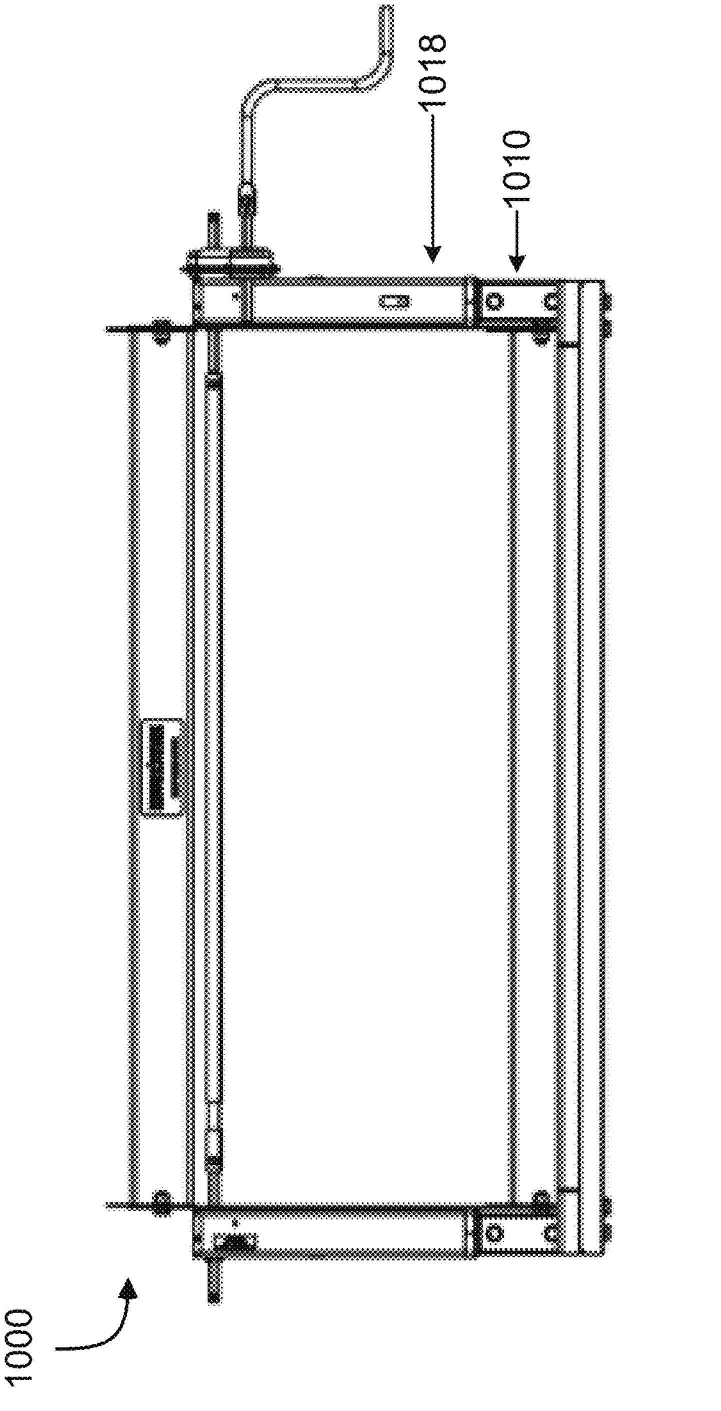
FIG. 11 illustrates a front view of a two stage lifting apparatus disclosed herein in a retracted state.
Figures 12, 13:
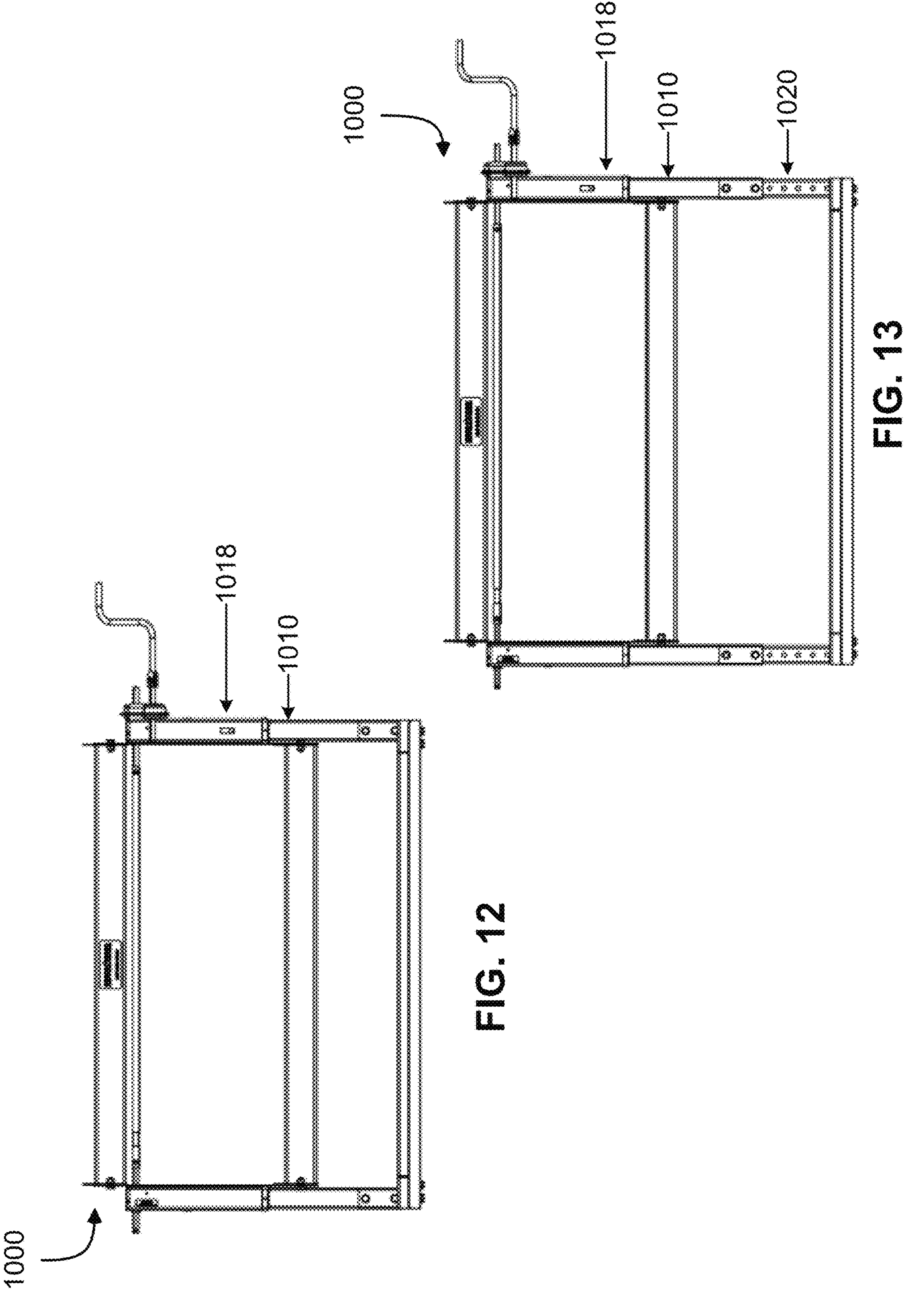
FIG. 12 illustrates a front view of a two stage lifting apparatus disclosed herein in a first stage extended state.
FIG. 13 illustrates a front view of a two stage lifting apparatus disclosed herein in a second stage extended state.

FIGS. 10-13 illustrate a two stage adjustable pipe support apparatus 1000. In particular, FIG. 10 illustrates an isometric view of two stage adjustable pipe support apparatus 1000, FIG. 11 illustrates a front view of two stage adjustable pipe support apparatus 1000 in a "lowest" configuration, FIG. 12 illustrates a front view of two stage adjustable pipe support apparatus 1000 with support section 1018 raised above at least a portion of base section 1010 according to first stage operation, and FIG. 13 illustrates a front view of two stage adjustable pipe support apparatus 1000 with support section 1018 raised above at least a portion of base section 1010 according to first stage operation and base section 1010 raised above at least a portion of extension section 1020 according to second stage operation.

Similar to apparatus 100, apparatus 1000 includes a pair of lifting towers 1002 substantially arranged at opposite ends and centered on base 1030. As further described below, lifting towers 1002 of the two stage apparatus 1000 include a base section 1010 and a support section 1018 that are configured to move with respect to one another using crank 1056. Unlike apparatus 100, two stage apparatus 1000 includes extension section 1020, which allows base section 1010 to be elevated higher and increase the range of heights at which support section 1018 can be arranged. In embodiments, one or more of base section 1010, support section 1018, and extension section 1020 can be hollow structural section (HSS), C- or U-channel, or other appropriate structure.

While design alternatives (which can be employed alone or in various combinations with any embodiment herein) can be identified by those of skill in the art on review of the drawings, components of apparatus 1000 have similar functions to those described with respect to apparatus 100. For example, in, e.g., FIG. 10, base hardware 1036 shows an alternative or complementary means for mounting lifting tower 1002 to base 1030. External flange 1034 can extend at an angle beyond structural channels 1032, and eyelets 1035 can be disposed therebetween. Eyelets 1035, lifting eyes 1048, and similar components of apparatuses herein can be referred to as "rigging points" connection points designed to bear the weight of the apparatus to permit its maneuvering (or emplacement/fixing in a location).

Lifting towers 1002 include flanges 1014, which can be coupled according to various techniques. Flanges 1014 include mounting holes 1012 configured to accept hardware to mount one or more beams such as, e.g., beams 1042 and 1044.

Like apparatus 1000, lifting tower flange 1014 moves up or down base section 1010 with support section 1018 to changes the height of horizontal beams 1042 and/or 1044. Lifting towers 1002 are given further range of motion in comparison to apparatus 100 by way of tower extension section 1020. Base section 1010 (and, by way of its coupling with base section 1010, support section 1018) can be further raised or lowered by moving base section 1010 up and down tower extension section 1020. Base section 1010, when installed, is fixed to tower extension section 1020 using removable hardware, providing a fixed height at which base section 1010 and tower extension section 1020 are coupled. When said hardware is removed, though, base section 1010 can be moved up or down tower extension section 1020 and attached at different heights by reinstalling the mounting hardware through one or more mounting holes at the bottom of base section 1010 and one or more holes 1022 of tower extension section 1020 provided at different heights along the length of tower extension section 1020. Put another way, the outer portion of lifting tower 1002, base section 1010, can include one or more hardware apertures, and the inner portion of lifting tower 1002, tower extension section 1020, can include a greater number of more hardware apertures, which can be aligned to position the outer portion at different vertical heights with respect to the inner portion (which is attached to base 130). In embodiments, keeper pins can be used to hold base section 1010 at different heights up or down extension section 1020.

Like apparatus 100, apparatus 1000 can include beam flange 1046, beam flange lifting eyes 1048. Lifting towers 1002 can be coupled to base 1030 in a variety of ways, including by way of foot 1033. Base 1030 can include structural channels 1032, which can be configured with a fork pocket to accept forklift forks or other equipment for maneuvering or placing (or emplacing and fixing) apparatus 1000.

To operate the first of the two stages, apparatus 1000 can include gearbox 1050 operatively coupled to crank 1056. The gear is also operatively coupled to lifting tower drive shaft 1052 (within lifting towers 1002) and axle 1054, allows rotation of the gear in gearbox 1050 to influence both lifting towers. Rotation of the gear in gearbox 1050, and rotation of axle 1054, can drive a mechanism for raising and lowering each support section 1018 in relation to each base section 1010, respectively.

FIGS. 14A, 14B, and 14C illustrate example hardware that can be used with drive functionality disclosed herein. For example, hardware can couple a shaft including a jack screw arranged lengthwise through a lifting tower and operatively coupled with a base section and a support section such that turning the screw raises or lowers the support section with respect to the base section. The jack screw can be turned using a bevel screw set disposed in a support section distal from the base section whereby the rotating of an axle (or crank) causes clockwise or counterclockwise rotation of the jack screw. An axle disclosed herein can pass between both drive towers, allowing a single axle (and a single crank or other mechanism operatively coupled therewith) to drive jack screws in two lifting towers to raise or lower support sections with respect to base sections thereof.

Figures 15A, 15B, 16A:
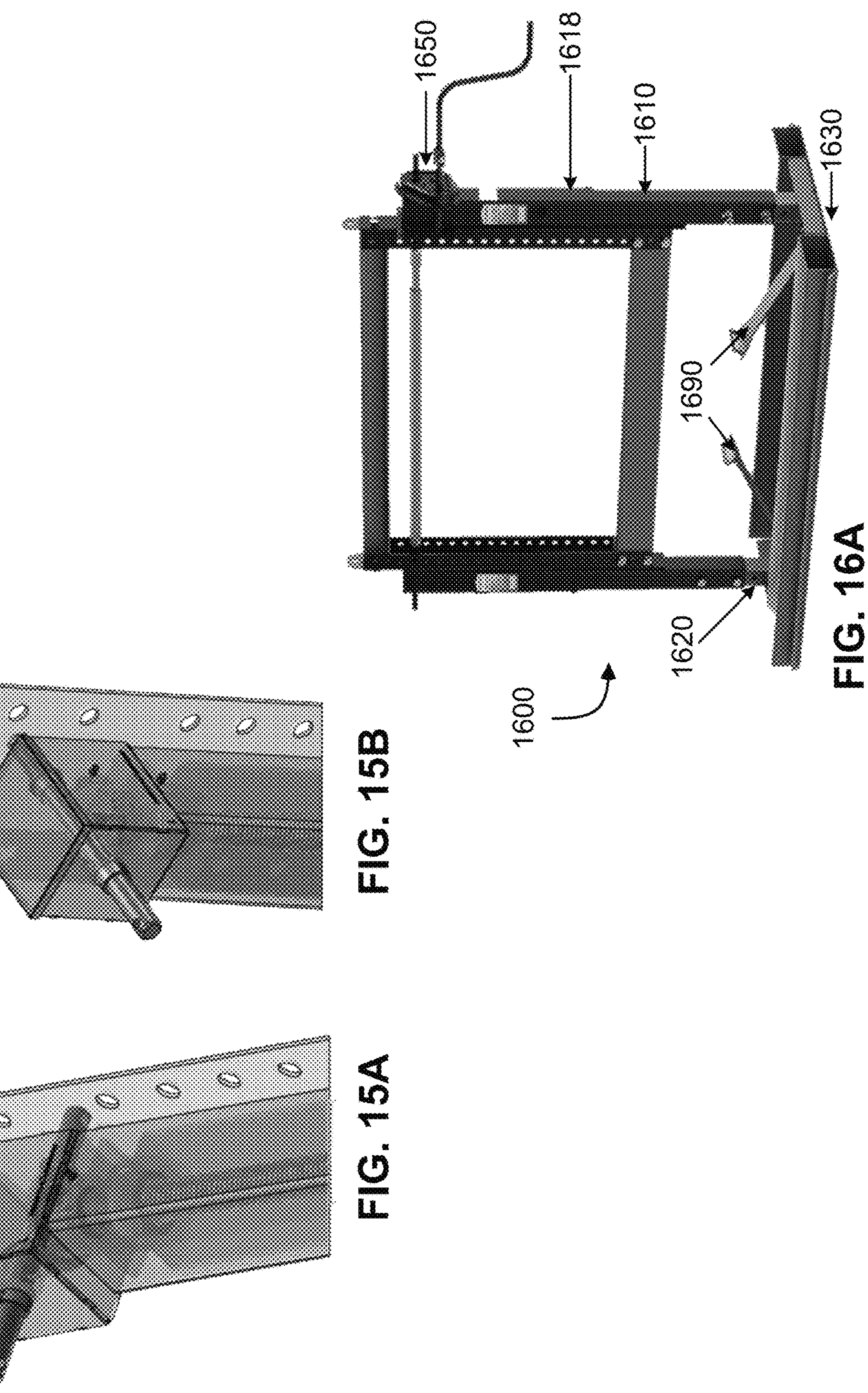
FIG. 15A illustrates a portion of a drive mechanism, shown within a lifting tower, disclosed herein.
FIG. 15B illustrates a portion of a drive mechanism, shown within a lifting tower, disclosed herein.
FIG. 16A illustrates a two-stage lifting apparatus disclosed herein including "kickstand"-type stops being partially deployed.

FIGS. 15A and 15B illustrate example hardware, such as that of FIGS. 14A, 14B and 14C, disposed within an embodiment of a portion of a lifting tower, shown with a support member partially transparent.

The embodiments of FIGS. 14A-15B illustrate a single speed drive; alternatives, including two-speed drives, can be utilized without departing from the scope or spirit of the innovation. In embodiments, the gear box used in these or other embodiments can be a custom built two speed drive train providing high and low speed travel. In embodiments, the gearbox and drive train can be rated for over 20 tons, or in alternative embodiments less than 20 tons.

Figures 16B, 16C:
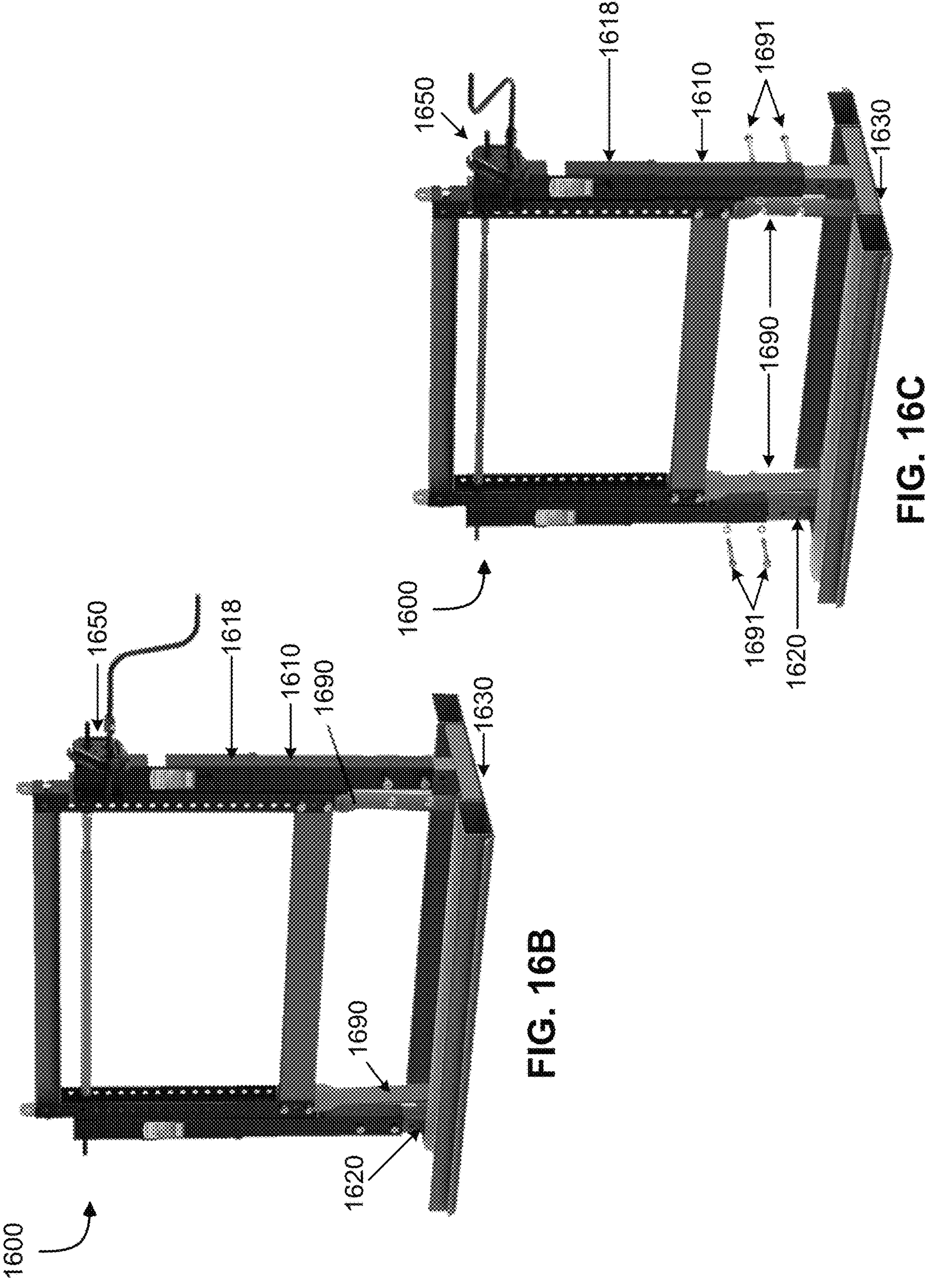
FIG. 16B illustrates a two-stage lifting apparatus disclosed herein including "kickstand"-type stops being fully deployed.
FIG. 16C illustrates a two-stage lifting apparatus disclosed herein including "kickstand"-type stops being used during adjustment of a second stage of the lifting apparatus.

FIGS. 16A, 16B, and 16C illustrate a two-stage lifting apparatus 1600 including rotatable bottom stops 1690 (e.g., "kickstands"). Apparatus 1600 includes base 1630, base section 1610, extension 1620, and support section 1618. Support section 1618 is raised or lowered with respect to base section 1610 using drive 1650. To provide additional height adjustment, base section 1610 can be raised or lowered along extension 1620 by removing hardware 1691 and sliding the larger-dimensioned base section 1610 up or down extension 1620 before reinstalling hardware 1691 at a desired height. Bottom stops 1690 can be rotatably coupled to base 1630 (or a foot of a lifting tower) such that they can be rotated upward before manipulating hardware 1691 and/or the arrangement between base section 1610 and extension 1620. In embodiments, bottom stops 1690 are sized to contact, or nearly contact, a bottom portion of support section 1618 (or mounting flange or beam mounted thereto) when support section 1618 is at a particular position with respect to base section 1610 (e.g., lowest height, highest height, midpoint, others) and base section 1610 is at a lowest position with respect to extension 1620.

FIG. 16A shows bottom stops 1690 partially deployed being rotated. Base stops 1690 can include handles or other extensions for ease of use, which may also be sized to contact and support a center portion of a cross beam mounted at a lowest position on support section 1618 when support section 1618 is at a lowest position. FIG. 16B shows bottom stops 1690 fully deployed beneath support section 1618. FIG. 16C shows hardware 1691 removed, with bottom stops 1690 preventing support section 1618 (and components attached thereto) from dropping or moving due to gravity. This prevents the apparatus from "bottoming out" or dropping suddenly, and can avoid or reduce harm to the system or people or equipment in the vicinity thereof by reducing impact forces and preventing a beam from coming closer to the base 1630.

In embodiments, the lifting towers can provide a jack-like function. Whereas typical jacks have limited amounts of travel, the lifting towers can be provided with elongate screws and/or other components to provide for, e.g., 15 or more inches of travel, 20 or more inches of travel, 30 or more inches of travel, or even greater distances of travel, providing unique functionality and flexibility. In a particular embodiment such as that of, e.g., FIGS. 1-9, approximately 30 inches of travel is provided using the drive mechanism(s) disclosed herein, which can include a gearbox. Such a gearbox can include two speeds, one high and one low, to permit options for fast and precise adjustment of height. In such embodiments, an apparatus disclosed can have a lift capacity of 50,000 pounds and a static load rating of 70,000 pounds. However, higher or lower ratings can be achieved by scaling or modifying the apparatuses disclosed herein according to the disclosures herein.

In embodiments, the lifting towers can include side bolted legs. In embodiments, this can reduce fabrication costs and improve the ease of replacing a fouled bolt, particularly in field environments. Holes can be placed in the sides of the feet of lifting towers permit fasteners to be moved to the side. Holes arranged in the sides of the feet, as opposed to on the bottom, avoids the need to lift the leg over the threads during installation or maintenance. When holes are arranged on the bottom, the installer or maintainer must deadlift the weight of the leg assembly, sometimes over 100 pounds, up onto the bolts. This can risk installer or maintainer injury as well as stripping the threading of the bolts or deforming the holes if the leg is not carefully aligned before and during placement. In the event of such damage, the bolts may need to be cut out with new bolts welded in, and/or the leg may not attach as securely. When the holes are alternately arranged on the side, an installer or maintainer can slide the leg into place (with little or no lifting), line up the bolt holes, and add a bolt that is not welded. A nonwelded bolt can be moved out of the way during installation, maintenance, or disassembly, and is very easy to replace if it is somehow damaged.

As discussed throughout, different sizes of lifting apparatuses can be used without departing from the scope or spirit of the innovation. Bases or beams, can be, e.g., four to seven feet long, or longer, or shorter, based on particular needs and use cases.

While embodiments of supports disclosed herein include various features for lifting, such as eyelets or channels for forks, alternative embodiments can exclude these elements without departing from the scope or spirit of the innovation.

While the foregoing focuses on the structural features of apparatuses disclosed herein, methods of making and using said apparatuses disclosed herein will be understood by those of ordinary skill in the art on review of this disclosure.

The many features and advantages of the disclosure are apparent from the detailed specification, and it is intended to cover all such features and advantages of the disclosure, which fall within the true spirit and scope of the disclosure. Since numerous modifications and variations will readily occur to those skilled in the art, it is not desired to limit the disclosure to the exact construction and operation illustrated and described, and, accordingly, all suitable modifications and equivalents that fall within the scope of the disclosure of this application are supported for claiming in this or related applications.

What is claimed is:

1. An apparatus, comprising:

a base comprising a flat plate;

a pair of structural channels arranged along opposite outer sides of the base;

a first lifting tower and a second lifting tower coupled to the base, wherein each of the first lifting tower and the second lifting tower extends perpendicularly to the base, and wherein each of the lifting towers comprises:

a base section extending upward from the base between the pair of structural channels;

a support section movably coupled to the base section, wherein the base section is at least partially arranged within the support section;

a lifting tower flange fixedly coupled to the support section, wherein the lifting tower flange includes a plurality of mounting holes configured to accept mounting hardware, wherein the lifting tower flange is wider than a widest dimension of the support section, and wherein the mounting holes are arranged on the lifting tower flange to prevent interference of the support section during installation or removal of mounting hardware; and a foot of the first lifting tower, wherein the foot is arranged along opposite outer sides of the base perpendicular to the pair of structural channels, wherein the foot is coupled to both of the pair of structural channels, and wherein the foot comprises a flat section parallel to the base, an exterior flange extending upward from the base and arranged on an edge of the base between the structural channels, and a pair of interior flanges spaced to substantially contact both of the pair of structural channels and including holes for bolting the foot to both of the pair of structural channels a drive operatively coupled to the first lifting tower, wherein the drive is operatively coupled to a first jack within the first lifting tower, wherein the first jack is configured to raise or lower the support section of the first lifting tower in relation to the base section of the first lifting tower based on operation of the drive; and an axle operatively coupled to the drive, wherein the axle is operatively coupled to a second jack within the second lifting tower, wherein the second jack is configured to raise or lower the support section of the second lifting tower in relation to the base section of the second lifting tower based on operation of the drive, and wherein the raising or lowering of each support section occurs in substantially equal amounts and substantially concurrently based on coupling of the axle to the drive.

2. The apparatus of claim 1, comprising:

at least one cross-beam support operatively coupled to each lifting tower flange and spanning between the first lifting tower and the second lifting tower.

3. The apparatus of claim 2, comprising:

a second cross-beam support coupled to the lifting tower flange of the lifting tower at a height below the at least one cross-beam support.

4. The apparatus of claim 2, wherein the at least one cross-beam support is a W-beam.

5. The apparatus of claim 2, wherein the at least one cross-beam support is a box beam.

6. The apparatus of claim 1, wherein an interior dimension of the pair of structural channels is configured to accommodate a forklift fork.

7. The apparatus of claim 1, where a distance between the pair of structural channels is configured to accommodate two forklift forks.

8. The apparatus of claim 1, wherein the axle is a slip fit axle.

9. The apparatus of claim 1, comprising at least one rigging point.

10. The apparatus of claim 1, wherein each of the first lifting tower and the second lifting tower comprise:

an extension section to which the base section is movably coupled, wherein extension section is arranged at least partially within the base section, and wherein the extension section includes along its length a plurality of holes configured to accept hardware fixing the base section at a height along the extension section.

11. The apparatus of claim 10, comprising at least one rotatable bottom stop.

12. The apparatus of claim 1, comprising:

a crank of the drive; and a first bevel gear set disposed between the crank and the first jack, wherein rotating the crank rotates the first bevel gear set, and wherein rotating the first bevel gear set rotates the first jack to raise or lower the support section with respect to the base section.

13. The apparatus of claim 12, comprising:

a second bevel gear disposed between the axle and the second jack, wherein rotating the crank rotates the axle, wherein rotating the axle rotates the second bevel gear set, and wherein rotating the second bevel gear set rotates the second jack to raise or lower the other support section with respect to the other base section.

14. The apparatus of claim 1, wherein the drive is a two speed drive.

15. The apparatus of claim 1, comprising:

a first structural channel and a second structural channel of the pair of structural channels, wherein the first lifting tower is removably coupled to the base using a first foot, and wherein the second lifting tower is removably coupled to the base using a second foot.

16. The apparatus of claim 1, comprising:

an extension section of each lifting tower, wherein the base section is fixed to the extension section using extension hardware.

17. The apparatus of claim 16, comprising:

at least one base stop.

18. The apparatus of claim 1, wherein the lifting tower flange is a substantially flat plate arranged parallel to the support section.

19. The apparatus of claim 1, comprising:

a flange lifting eye arranged at a top of the lifting tower flange, wherein the flange lifting eye is disposed above a top of the support section.

20. The apparatus of claim 19, wherein the lifting tower flange includes a tapered top portion, and wherein the flange lifting eye is disposed within the tapered top portion.

* * * * *